Figure 1:
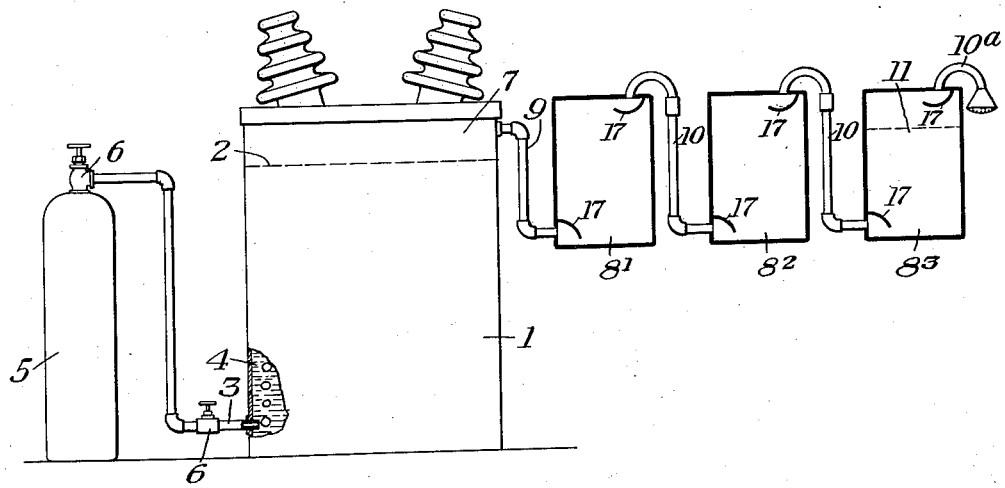

Sept. 6, 1927.

C. L. JONES 1,641,814

MAINTAINING INERT ATMOSPHERES IN ELECTRICAL APPARATUS

Filed April 20, 1926

INVENTOR
Charles L. Jones
by his attorneys
Byrnes, Stebbins & Parmelee

Patented Sept. 6, 1927.

1,641,814

UNITED STATES PATENT OFFICE.

CHARLES L. JONES, OF PITTSBURGH, PENNSYLVANIA.

MAINTAINING INERT ATMOSPHERES IN ELECTRICAL APPARATUS.

Application filed April 20, 1926. Serial No. 103,272.

The present invention relates to maintaining inert atmospheres in electrical apparatus and more especially to the maintenance of an atmosphere of inert gas such as carbon dioxide over the oil in oil immersed types of electrical apparatus such as transformers.

In apparatus of this type it is desirable to maintain an inert atmosphere over the oil bath to prevent the oxidation of the oil and to materially lessen the hazard of fire and explosion. It is found that the oil immersed electrical apparatus such as electrical transformers "breathe" due to temperature variations to which the oil and contents of the transformer casing are subjected. This breathing is due to a rise in the oil level and to the expansion of the gas in the casing under temperature changes and tends to expel the gas through leaks in the casing during the expansion part of the cycle and to draw in air during the contraction part of the breathing cycle.

Various schemes have been proposed to prevent the contamination of the inert gas by the air but these have been relatively expensive and complicated and have involved deoxygenating the air drawn in through oxygen absorbing devices or have involved gasometer or valve systems by which it has been sought to confine the inert atmosphere.

I have discovered that the inert atmosphere may be maintained in the electrical apparatus by very simple apparatus which allows the apparatus to breathe. I take advantage of the difference in specific gravity between the inert gas and the air and I have found that with a gas such as carbon dioxide there is a very slow rate of diffusion into the air so that the carbon dioxide in the air may be maintained in separate layers in an open breather connection from the apparatus to the air.

My invention will now be described with particular reference to its illustrated embodiment for maintaining an inert atmosphere of carbon dioxide over the oil in an oil immersed electrical transformer, it being understood however, that the invention is not limited to its illustrated embodiment.

Figure 2:
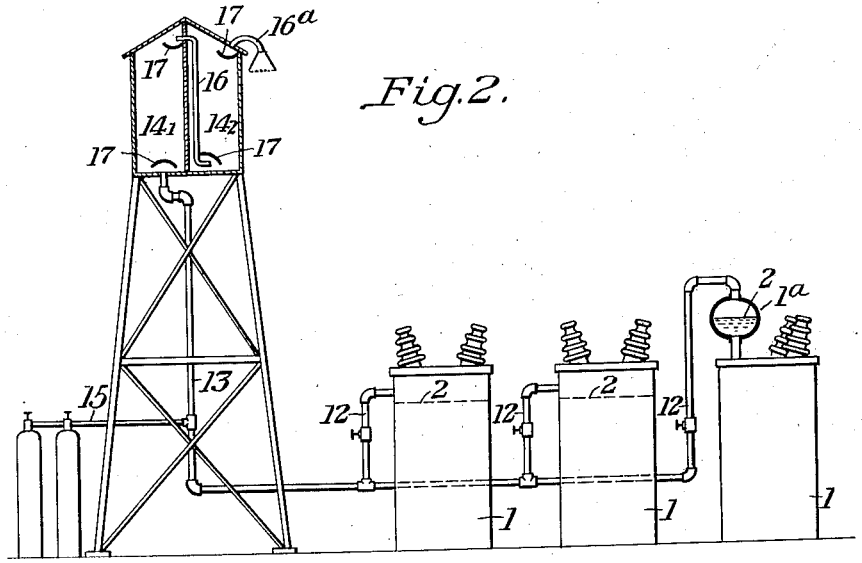

In the drawings,

Figure 1 is a diagrammatic elevation of an electrical transformer and connected apparatus for maintaining the inert atmosphere therein, and Figure 2 is a similar view showing a modification in which a slight positive pressure of the inert gas is maintained in the transformer.

Referring to the illustrated embodiment of the invention, reference numerals 1 indicate electrical transformers. The transformers may be with or without conservators. The right hand transformer shown in Figure 2, is provided with a conservator $1^a$ in which the oil level is maintained, the transformer itself being entirely full of oil and the oil rising and falling in the conservator chamber. The dotted lines 2 indicate the oil levels in the transformers themselves or in the conservators of the transformer. In each case an inert atmosphere is maintained in the electrical apparatus, in one case the inert atmosphere being maintained in the top of the transformer casing, and in the other casing being maintained in the conservator attachment. The oil level is indicated by the dotted line 2, above which is to be maintained an inert atmosphere. An inert gas, preferably carbon dioxide, is supplied to the transformer through the pipe 3 and bubbles up through the oil 4. The gas may also be introduced above the oil level. The gas is supplied from a suitable container under pressure illustrated as the ordinary cylinder 5 of compressed carbon dioxide. The gas is reduced in pressure and is discharged at a very slow rate through suitable controlling valves 6. The gas is preferably supplied continuously to the transformer through a very slow leak through the regulating valves, although the gas may be supplied intermittently if so desired. The excess gas escapes from the gas space 7 in the top of the transformer through a breather connection which contains one or more chambers $8_1$, $8_2$, and $8_3$. There are preferably employed a number of these chambers as illustrated. The chamber $8_1$ has a connection 9 from its bottom to the gas space 7 of the transformer and has a vent connection 10 from its top to the bottom of the second chamber $8_2$. The chamber $8_2$ in turn, has a vent connection 10 to the bottom of the chamber $8_3$ which in turn, has a vent connection $10^a$ from its top to the atmosphere. A quiescent atmosphere is maintained in the chambers $8_1$, $8_2$, $8_3$, so that the carbon dioxide and air are allowed to remain separate therein due to the difference in their specific gravities. In order to avoid or minimize turbulence of the gases in the chambers, deflectors 17 may be used to prevent the incoming streams of air or carbon dioxide from stirring up the atmosphere in the chambers.

When the electrical apparatus is operating under constant load and temperature conditions, the breather connection containing the chambers $8_1$, $8_2$, $8_3$ will gradually become entirely filled with the carbon-dioxide gas. If the temperature of the transformer rises, the transformer will tend to exhale and the excess gas will be discharged through the vent $10^a$. If the temperature of the transformer falls, the transformer will inhale and air will be drawn in through the vent $10^a$. This air will, because of its lesser specific gravity, lie in a supernatant layer above the heavier carbon dioxide gas in the bottom of the chamber $8_3$. There will be a more or less sharp horizontal plane of separation between the air and carbon dioxide layers as indicated by the dotted line 11. If the transformer inhales a greater volume than that of the chamber $8_3$, it will be emptied of carbon dioxide and the air will be sucked into the upper part of the chamber $8_2$ in which the gravity separation of the carbon dioxide and air will be maintained.

I have found that the rate of diffusion of carbon dioxide into air is so slow that the gravity separation between the carbon dioxide and air will serve to prevent the air from passing through the breather connection into the transformer. The diffusion of the carbon dioxide from the air into the transformer casing may be, for all practical purposes, absolutely prevented by employing a plurality of chambers in the breather or vent connection through which the transformer inhales and exhales and it is preferable to employ a plurality of chambers in the breather connection rather than a single chamber of larger capacity. As an additional precaution, oxygen absorbing materials such, for example, as sponge iron and calcium chloride, may be put in the chamber or chambers nearest the transformer.

In the form of apparatus shown in Figure 1, the pressure of the gas in the transformer is maintained atmospheric and there is no tendency for the air to be drawn in through any leaks in the transformer casing or around the insulators. In the form of apparatus shown in Figure 2 there is maintained a slight superatmospheric pressure on the carbon dioxide in the transformer casings so that there is always a tendency for the gas to flow out through any leaks in the transformer casings and thus absolutely prevent any air being sucked into the transformers. The form of apparatus shown in Figure 2, is essentially like that of Figure 1 except that there is maintained a column of carbon dioxide gas, which, because of its greater specific gravity, maintains a slight positive pressure of the gas in the transformers. In Figure 2 are shown a number of transformers of the oil immersed type having connections 12 to the breather pipe 13, which extends to the elevated chambers $14_1$ and $14_2$. The carbon dioxide may be supplied to the transformers in any suitable manner. In the drawings there is shown a connection 15 from the carbon dioxide supply cylinders to the breather pipe to maintain the carbon dioxide atmosphere in the breather pipe and in the transformers. In this case, the transformers are initially filled with carbon dioxide as by some auxiliary source which is temporarily connected to give the initial charge, or by continuously bleeding in a small amount of carbon dioxide as shown in the system as illustrated in the drawings. The carbon dioxide need not be discharged directly into the transformers since there is always maintained a positive gas pressure therein. The vertical part of the breather pipe 13 furnishes a column of carbon dioxide which, because of its greater specific gravity, maintains the slight pressure of gas in the transformers. The pipe 13 is connected to the bottom of the quiescent chamber $14_1$ and a vent connection 16 extends from the top of chamber $14_1$ to the bottom of the chamber $14_2$ which in turn is vented from its top to the atmosphere through a vent $16^a$. The operation of the device is similar to that of Figure 1. The chambers $14_1$ and $14_2$ furnish quiescent spaces in which the carbon dioxide and air are allowed to maintain their separate layers due to their difference in specific gravity. While a single chamber may be employed, it is preferable to have two or more chambers in order to minimize diffusion. The chambers, being of considerable capacity, take up the excess carbon dioxide exhaled by the transformers or the air drawn in when the transformers inhale, their capacity being such that the level or plane of separation between the carbon dioxide and air never reaches the pipe 13.

My apparatus is extremely simple and inexpensive. Instead of trying to confine the atmosphere of the transformer or control it by valves or gasometers, I leave an open connection through which the transformer may freely breathe, but at the same time, prevent the infiltration or diffusion of air through the open breathing connection through the transformer.

While I have illustrated and described the invention with particular reference to transformers, it may be applied to any other type of oil immersed electrical apparatus in which it is desired to maintain an inert atmosphere. While I prefer to use carbon dioxide as the inert gas because of its availability, cheapness and relatively high specific gravity, other inert gases may be employed, particularly those which have a specific gravity considerably different from that of air. By "inert gases", I mean gases which will not oxidize the oil. For example, the heavy rare gases of the atmosphere, argon, krypton or xenon may be used in the same way as carbon dioxide. Also, gases having a reducing reaction such as the hydrocarbons, butane, butylene, etc., may be used either alone or mixed with other gases, for example, carbon dioxide. For instance, a mixture of 95% carbon dioxide and 5% of a reducing gas offers no fire hazard but will exert a reducing action on free or combined oxygen in the oil not possible with carbon dioxide alone. In case a gas of specific gravity less than air should be used, the same principle of gravity separation may be employed, in which case however, the chambers would have their tops connected to or toward the transformer and would be vented from their bottoms so that the lighter inert gas would lie on top of the heavier air.

While the invetnion is particularly applicable for the maintenance of a non-oxidizing atmosphere over apparatus of the oil immersed type, it may be used in other electrical apparatus not oil immersed in which it is desired to maintain a non-oxidizing or inert atmosphere.

While I have specifically illustrated and described the preferred embodiment of my invention, it is to be understood that the invention is not limited to its illustrated embodiment but can be otherwise embodied within the scope of the following claims.

I claim:

1. The method of maintaining a non-oxidizing atmosphere under a slight superatmospheric pressure in electrical apparatus, which comprises supplying to the apparatus a non-oxidizing gas having a specific gravity greater than that of air, and allowing the apparatus to breathe through an open connection to the air which includes an elevated chamber in which the gas and air are maintained separate by their difference in specific gravity.

2. The method of maintaining a non-oxidizing atmosphere in electrical apparatus which comprises supplying to the apparatus a non-oxidizing gas having a specific gravity different from that of air, and allowing the apparatus to breathe through a chamber in which the gas and air are maintained separate by gravity.

3. The method of maintaining a non-oxidizing atmosphere in electrical apparatus which comprises supplying carbon dioxide gas to the apparatus and allowing the apparatus to breathe into the bottom of a chamber which has an open vent at its top and in which the carbon dioxide and air are maintained in layers by their difference in specific gravity.

4. The combination with electrical apparatus, of means for supplying to the apparatus non-oxidizing gas having a specific gravity greater than that of air, and an open breather connection to the air in which is maintained a gravity separation of the non-oxidizing gas and the air, said breather connection opening to the air at a sufficient distance above the electrical apparatus so as to maintain a slight superatmospheric pressure of the gas therein.

5. The combination with electrical apparatus, of means supplying to the apparatus non-oxidizing gas having specific gravity greater than that of air, and a breather chamber having an open connection from its bottom to the electrical apparatus and an open vent at its top.

6. The combination with electrical apparatus, of means for supplying carbon dioxide gas to the apparatus and an open breather connection to the air, including a chamber having an open connection from its bottom to the electrical apparatus and an open vent at its top and in which the carbon dioxide and air are maintained separate by gravity.

7. The combination with electrical apparatus, of means for supplying carbon dioxide gas to the apparatus and an open breather connection to the air comprising a plurality of chambers connected in series and having an open connection between the electrical apparatus and the bottom of the adjacent chamber, an open vent to the air at the top of the chamber at the opposite end of the series, and an open connection between adjacent chambers leading from the top of one chamber to the bottom of the next chamber in the direction away from the electrical apparatus.

In testimony whereof I have hereunto set my hand.

CHAS. L. JONES.